(12) United States Patent
Bensmann et al.

(10) Patent No.: US 11,440,665 B2
(45) Date of Patent: Sep. 13, 2022

(54) VENTED LEADING-EDGE ASSEMBLY AND METHOD FOR MANUFACTURING A VENTED LEADING-EDGE ASSEMBLY

(71) Applicant: Airbus Operations GmbH, Hamburg (DE)

(72) Inventors: Stefan Bensmann, Hamburg (DE); Marcus Erban, Hamburg (DE)

(73) Assignee: Airbus Operations GmbH

( * ) Notice: Subject to any disclaimer, the term of this patent is extended or adjusted under 35 U.S.C. 154(b) by 300 days.

(21) Appl. No.: 16/595,722

(22) Filed: Oct. 8, 2019

(65) Prior Publication Data
US 2020/0148368 A1 May 14, 2020

(30) Foreign Application Priority Data
Oct. 23, 2018 (DE) ...................... 10 2018 126 305.8

(51) Int. Cl.
*B64D 15/04* (2006.01)
*B64C 3/26* (2006.01)

(52) U.S. Cl.
CPC .............. *B64D 15/04* (2013.01); *B64C 3/26* (2013.01)

(58) Field of Classification Search
CPC .... B64C 9/22; B64C 9/24; B64C 9/26; B64C 21/02; B64C 21/04; B64C 3/26; B64D 15/00–14
See application file for complete search history.

(56) References Cited

U.S. PATENT DOCUMENTS

| | | | |
|---|---|---|---|
| 1,797,160 A * | 3/1931 | Spencer | B64D 15/04 244/134 B |
| 3,933,327 A | 1/1976 | Cook et al. | |
| 4,738,416 A * | 4/1988 | Birbragher | F02C 7/047 244/134 B |
| 4,752,049 A | 6/1988 | Cole | |
| H648 H * | 7/1989 | Tran | 244/134 B |
| 6,394,396 B2 * | 5/2002 | Gleine | B64D 15/04 244/198 |

(Continued)

FOREIGN PATENT DOCUMENTS

| | | |
|---|---|---|
| CN | 201472669 U | 5/2010 |
| CN | 205440885 U | 8/2016 |

(Continued)

OTHER PUBLICATIONS

Extended European Search Report including the Written Opinion for Application No. EP 19203214.2 dated Jan. 9, 2020, 14 pages.

(Continued)

*Primary Examiner* — Nicholas McFall
*Assistant Examiner* — Marisa V Conlon
(74) *Attorney, Agent, or Firm* — Lerner, David, Littenberg, Krumholz & Mentlik, LLP

(57) ABSTRACT

A vented leading-edge assembly is provided, the assembly including: a slat having a bay and a top skin delimiting a portion of the bay; a spar being arranged in the slat, the spar dividing the bay in a front bay and an aft bay; and a plurality of channel sidewalls being arranged between the top skin and the spar, the plurality of channel sidewalls defining a plurality of channels between the front bay and the aft bay, wherein at least a portion of the spar defines lower channel walls for the plurality of channels.

10 Claims, 5 Drawing Sheets

(56) References Cited

U.S. PATENT DOCUMENTS

| | | | | |
|---|---|---|---|---|
| 6,698,691 | B2* | 3/2004 | Porte | B64D 15/04 244/134 B |
| 8,387,362 | B2* | 3/2013 | Storage | F28F 1/022 60/266 |
| 8,413,930 | B2* | 4/2013 | Gregory | B64D 15/04 244/134 B |
| 8,448,901 | B2* | 5/2013 | Porte | B64D 15/04 244/134 B |
| 9,896,190 | B1* | 2/2018 | Amorosi | B64C 21/02 |
| 2001/0023909 | A1 | 9/2001 | Laugt | |
| 2018/0170557 | A1 | 6/2018 | Lorenz | |
| 2020/0346738 | A1* | 11/2020 | Erban | B64D 27/18 |
| 2021/0237850 | A1* | 8/2021 | Turner | B64C 9/08 |

FOREIGN PATENT DOCUMENTS

| | | |
|---|---|---|
| DE | 3642791 A1 | 7/1987 |
| DE | 60102840 T2 | 4/2005 |
| EP | 1554174 B1 | 8/2016 |
| EP | 2590857 B1 | 8/2017 |
| EP | 3216697 B1 | 8/2018 |
| WO | 1995014960 A1 | 6/1995 |
| WO | 1999054181 A2 | 10/1999 |
| WO | 0064737 A1 | 11/2000 |
| WO | 2002081518 A2 | 10/2002 |
| WO | 2003029922 A2 | 4/2003 |
| WO | 2004037641 A2 | 5/2004 |
| WO | 2006027624 A1 | 3/2006 |
| WO | 2007070034 A2 | 6/2007 |
| WO | 2010128299 A1 | 11/2010 |
| WO | 2012004594 A1 | 1/2012 |
| WO | 2013033654 A1 | 3/2013 |
| WO | 2014142937 A1 | 9/2014 |
| WO | 2015198093 A1 | 12/2015 |
| WO | 2018005529 A1 | 1/2018 |

OTHER PUBLICATIONS

German Search Report for Application No. DE 10 2018 126 305.8 dated Jul. 4, 2019, 2 pages (p. 2 categorizing cited references).

* cited by examiner

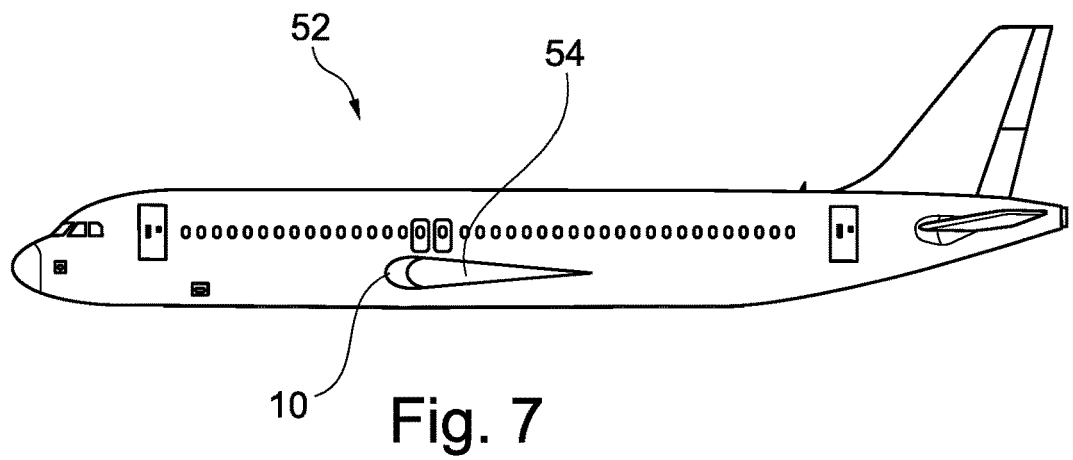
Fig. 7
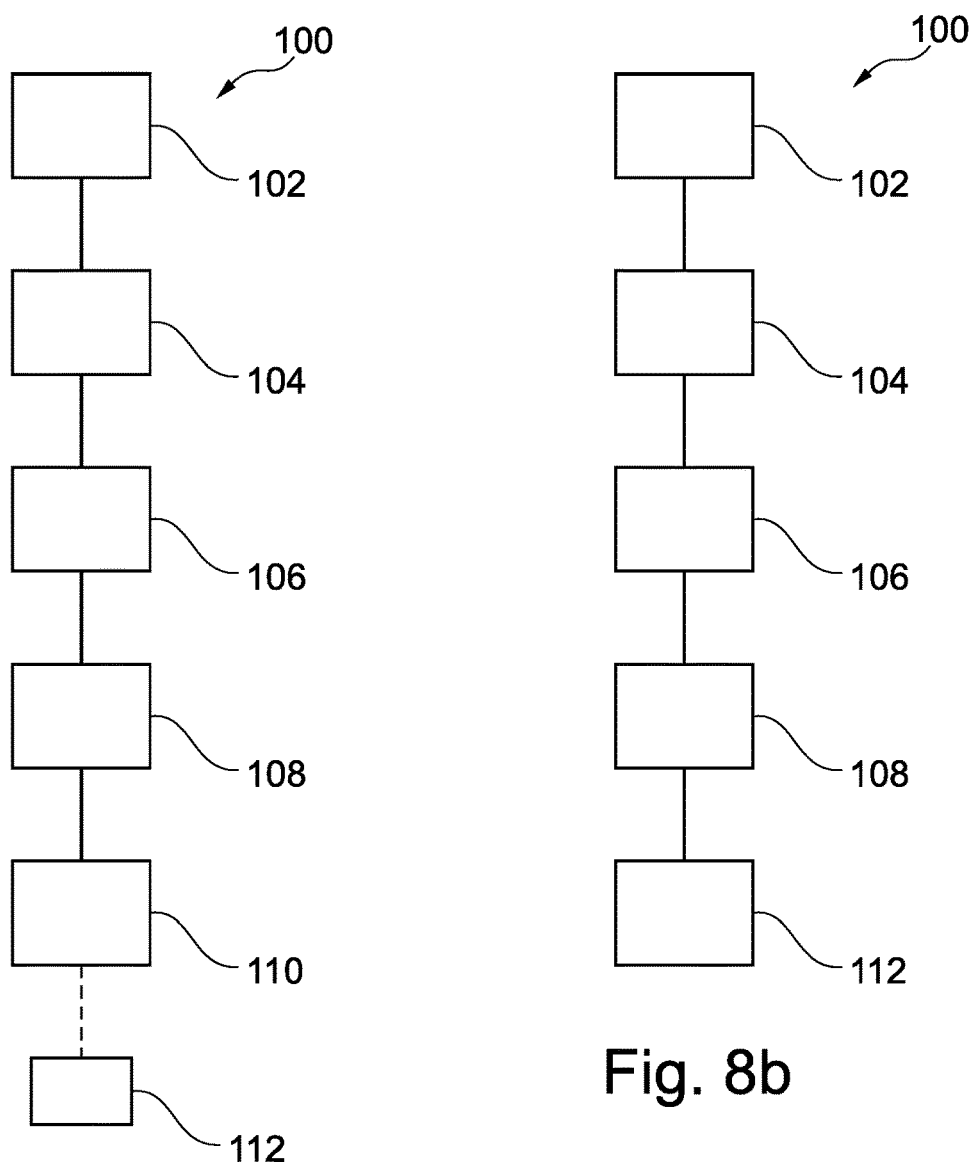
Fig. 8a
Fig. 8b

VENTED LEADING-EDGE ASSEMBLY AND METHOD FOR MANUFACTURING A VENTED LEADING-EDGE ASSEMBLY

FIELD OF THE INVENTION

The invention relates to a vented leading-edge assembly, the assembly comprising: a slat comprising a bay and a top skin delimiting a portion of the bay; a spar being arranged in the slat, the spar dividing the bay in a front bay and an aft bay; and a plurality of channel sidewalls being arranged between the top skin and the spar, the plurality of channel sidewalls defining a plurality of channels between the front bay and the aft bay and a method for manufacturing a vented leading-edge assembly.

BACKGROUND OF THE INVENTION

Aircrafts flying at great heights may be subject to icing of the wings. Typically, the ice may form on the leading-edge of the wing. The leading-edge of the wing may comprise a slat. A common approach to prevent icing is to heat up the concerned parts with bleed air from the engines. This is not trivial since the slat body usually comprises a spar which separates the interior structure of the slat into two chambers. Furthermore, the bleed air streams out of the tube which is arranged in a front chamber of the slat. To lead the bleed air between the two chambers in the slat it is known to provide a special part between the upper part of the spar and the top skin of the slat. That special part comprises channels which allow the bleed air to travel from one chamber to another. The aft chamber of the slat may further comprise an air outlet to the outside of the slat to compensate the pressure which is increased by the inflowing bleed air.

According to CN 2014 72669 U the upper skin of the slat comprises grooves on its inner side. The grooves are covered by an inner skin which is arranged between the spar and the inner side of the top skin of the slat.

The manufacturing of the grooves or the special part requires complex milling which may lead to a long and expensive production cycle.

BRIEF SUMMARY OF THE INVENTION

Thus, there may be the need for providing an improved leading-edge assembly and an improved method of manufacturing a leading-edge assembly.

According to an embodiment of the invention, a vented leading-edge assembly is provided, the assembly comprising: a slat comprising a bay and a top skin delimiting a portion of the bay; a spar being arranged in the slat, the spar dividing the bay in a front bay and an aft bay; and a plurality of channel sidewalls being arranged between the top skin and the spar, the plurality of channel sidewalls defining a plurality of channels between the front bay and the aft bay, wherein at least a portion of the spar defines lower channel walls for the plurality of channels.

An aspect of the invention therefore provides channels which are defined by the channel sidewalls and the spar as lower channel wall for each channel. Furthermore, the top skin of the slat may provide an upper channel wall for the channels. The channel sidewalls are separate elements from the top skin of the slat and from the spar. Consequently, milling procedures on the slat or on the spar to provide sidewalls which are integral to the slat or the spar are avoided. Furthermore, since at least a portion of the spar defines a lower channel wall for each of the plurality of the channels, for manufacturing the channels the channel sidewalls may just be placed on the portion of spar between the spar and the top skin of the slat. This simplifies and accelerates the production of the vented leading-edge assembly. This allows a high rate production of the vented leading-edge assembly. Furthermore, since milling is avoided, the production of the vented leading-edge is simple and cost-effective.

In an example, the plurality of channel sidewalls is non-parallel to each other such that a distance between the plurality of channel sidewalls at the front bay is bigger than a distance between the plurality of channel sidewalls at the aft bay.

Due to the different distances between the channel sidewalls and non-parallel channel sidewalls the cross section of the channel reduces from the front bay to the aft bay. A flow of bleed air starting in the front bay will be accelerated when passing the channels in direction of the aft bay. Due to the acceleration of the bleed air flow, the flow keeps its flow direction after exiting the channel which leads the bleed air flow along the total length of the top skin. This avoids a stop or a dissipation of the bleed air flow before reaching the end of the top skin of the slat being distal to the leading-edge of the slat. Consequently, the complete top skin of the slat may be heated by the bleed air.

In another example, the plurality of channel sidewalls is parallel.

In this example, the channels being formed by the channel sidewalls do not accelerate the bleed air flow. Such channels may be provided if the pressure of the bleed air flow is sufficient to flow along the entire length of the top skin.

In a further example, the leading-edge assembly comprises a plurality of fastening elements connecting the top skin to the spar through the plurality of channel sidewalls.

That kind of connection of the plurality of channel sidewalls to the top skin and to the spar is simple and cost effective.

Furthermore, in an example, the plurality of channel sidewalls is provided by a perforated strip being arranged between the top skin and the spar. The perforated strip may comprise a single row of perforations along the length of the strip.

Such a perforated strip can be easily produced by stamping the row of perforations into the strip. Alternatively, the strip may be laser cut, water jet cut, electron beam cut or further cutting methods. The material between the perforations on the strip defines the channel sidewalls. The stamping may further define the shape of the perforations and thus the angle between the channel sidewalls. When mounting the perforated strip on the spar, the row of perforations may be arranged such that they bridge the complete portion of the spar which defines the lower channel wall of the plurality of channels. Furthermore, they may be mounted such that they are in fluid communication with the front bay and the aft bay. Thus, by just mounting the perforated strip between the spar and the top skin of the slat, all of the plurality of channel sidewalls may be provided at once.

In another example, the plurality of channel sidewalls is provided by a comb being arranged between the top skin and the spar.

In this example, the teeth of the comb define the channel sidewalls. The comb may for example be manufactured by stamping, laser cutting, water jet cutting or electron beam cutting. Alternatively, one portion of a perforated strip may be removed, wherein the portion is in contact with the row of perforations. Both alternatives provide a simple way to mount the channel sidewalls between the spar and the top skin of the slat. Furthermore, the comb provides channels which, at least at one end, do not have any material obstructing the airflow.

In an example, the channel sidewalls comprise a common flange protruding from the plurality of channel sidewalls and extending along the spar, wherein preferably fixation elements connect the flange to the spar.

The flange provides an increased stability for the fixation of the channel sidewalls to the spar. This further increases the area moment of inertia of a structure. Thus, the stability of the vented leading-edge assembly is improved.

Moreover, in another example, the front bay comprises a de-icing air outlet being configured to fill the front bay with de-icing air.

In that example, the de-icing air outlet may be a bleeding air outlet being in fluid communication with an engine of an aircraft.

According to an embodiment of the invention, also an aerospace vehicle is provided, the aerospace vehicle comprising: a wing; and a vented leading-edge assembly according to the above description; wherein the vented leading-edge assembly is arranged on a leading-edge of the wing.

The effects and further embodiments of an aerospace vehicle according to the present invention are analogous to the effects and embodiments of the description mentioned above. Thus, it is referred to the above description of the vented leading-edge assembly.

According to an aspect of the invention, also a method for manufacturing a vented leading-edge assembly is provided, the method comprising the following steps: providing a slat comprising a bay and a top skin delimiting a portion of the bay; arranging a spar in the bay such that the spar divides the bay into a front bay and an aft bay; providing a strip comprising a row of a plurality of perforations; and connecting the strip between the spar and the top skin such that each perforation is in fluid communication with the front bay and the aft bay forming a channel between the front bay and the aft bay.

The effects and further embodiments of a method according to the present invention are analogous to the effects and embodiments of the description mentioned above. Thus, it is referred to the above description of the vented leading-edge assembly.

In an example, the method further comprises at least one of the following steps: removing at least one portion of the strip being arranged between the row and the aft bay; removing at least one portion of the strip being arranged between the row and the front bay.

This may remove obstacles in the path of the streaming air and further reduces the weight of the leading-edge assembly.

BRIEF DESCRIPTION OF THE DRAWINGS

In the following the invention is described by the means of an exemplary embodiment using the attached drawings.

FIG. 7 shows a schematic drawing of an aerospace vehicle.

FIGS. 8a, 8b show flow charts of different embodiments of the method.

DETAILED DESCRIPTION

Figure 1:
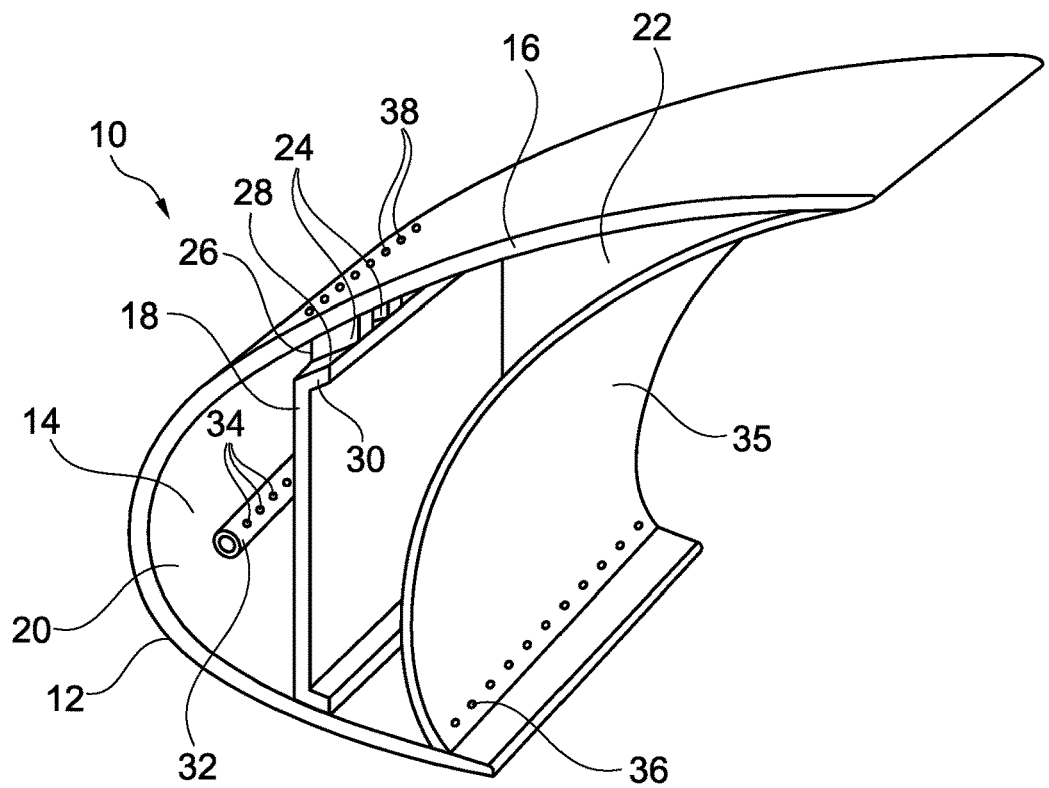
FIG. 1 shows a schematic drawing of a vented leading-edge assembly.

FIG. 1 shows a schematic drawing of a vented leading-edge assembly which in its entirety is denoted with reference sign 10.

The vented leading-edge assembly 10 comprises a slat 12 having a top skin 16 and a rear skin 35. The top skin 16 and the rear skin 35 delimit portions of a bay 14 which forms a chamber inside the slat 12. The rear skin 35 comprises openings 36 which provide a fluid communication between the bay 14 and the space outside of the slat 12.

The vented leading-edge assembly 10 further comprises a spar 18. The spar 18 is arranged in the bay 14 of the slat 12. The spar 18 comprises a portion 30 which is arranged parallel to the top skin 16. Furthermore, the spar 18 divides the bay 14 into a front bay 20 and an aft bay 22. The front bay 20 is arranged closer to the leading-edge of the slat 12 than the aft bay 22.

To de-ice the slat 12, the vented leading-edge assembly 10 may for example comprise a de-icing air outlet 32 which may be arranged in the front bay 20. The de-icing air outlet 32 may be a pipe which is in fluid communication with an engine of an aerospace vehicle. The engine provides bleeding air to the pipe. The de-icing air outlet 32 may then comprise outlet openings 34 which allow the bleed air to be introduced into the front bay 20.

The vented leading-edge assembly 10 further comprises a plurality of channel sidewalls 24 being provided between the portion 30 of the spar 18 and the top skin 16. For example, the channel sidewalls 24 may be sheets, plates or portions thereof. In combination with the portion 30 and the top skin 16, the plurality of channel sidewalls 24 provide a plurality of channels 26 being arranged between the top skin 16 and the spar 18. The portion 30 of the spar 18 then forms a lower channel wall 28 for each of the plurality of the channels 26. Those plurality of channels 26 provide fluid communication between the front bay 20 and the aft bay 22.

Fastening elements 38 may be provided to fix the spar 18 to the top skin 16. Those fastening elements 38 may be rivets or screws or the like. The fastening elements 38 connect the top skin 16 through the plurality of channel sidewalls 24 to the portion 30 of the spar 18.

Figure 2:
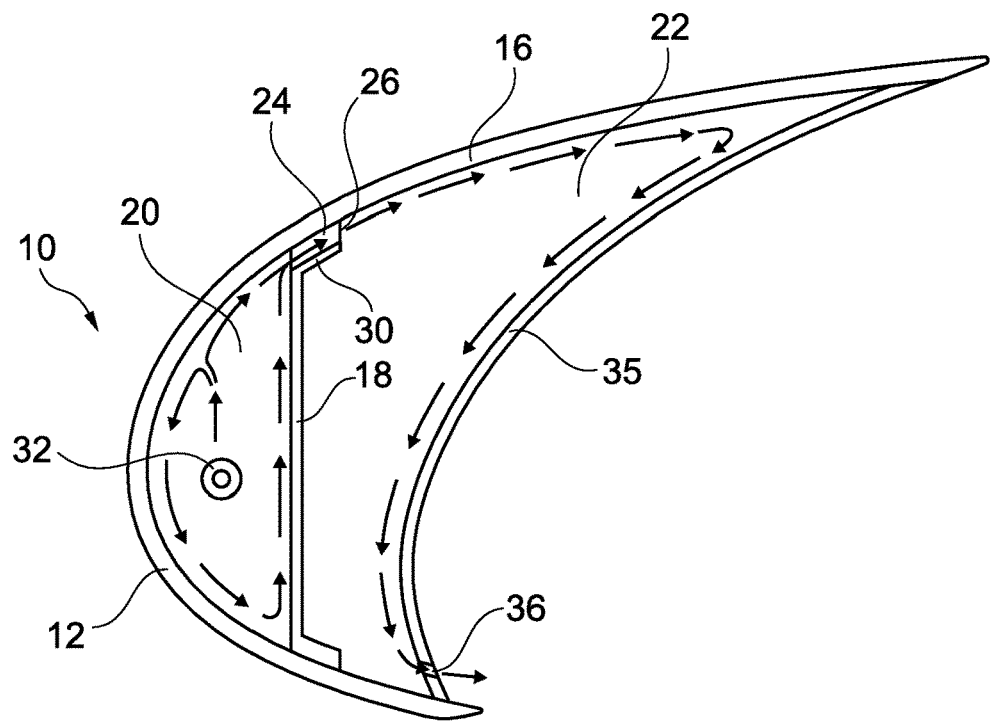
FIG. 2 shows a schematic longitudinal cross section of FIG. 1 with an indicated airflow.

An example of an airflow of de-icing air is indicated in FIG. 2. The de-icing air which may be bleed air from an aircraft engine exits from the de-icing air outlet 32 and flows along the walls of the front bay 20. This means, that the skin of the slat 12 at the front bay 20 is heated by the de-icing air. The de-icing air flows along the top skin 16 towards the spar 18. At the spar 18, the de-icing air flows through the plurality of channels 26 from the front bay 20 to the aft bay 22. The flow of the de-icing air continues along the top skin 16 in the aft bay 22. The inflowing de-icing air increases the pressure in the aft bay 22. This increased pressure leads to a flow towards and through the openings 36 in the rear skin 35. The openings 36 vent the aft bay 22 to the outside air.

Figure 3A:
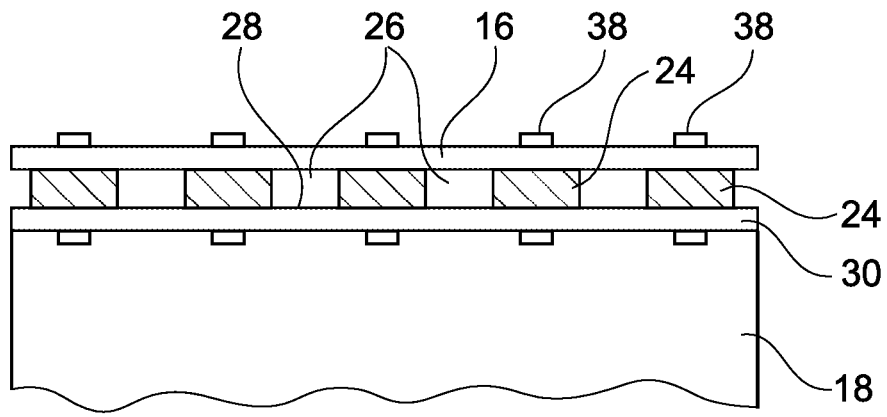
FIGS. 3a, 3b show a schematic drawings of different view angles on the channel sidewalls.
Figure 3B:
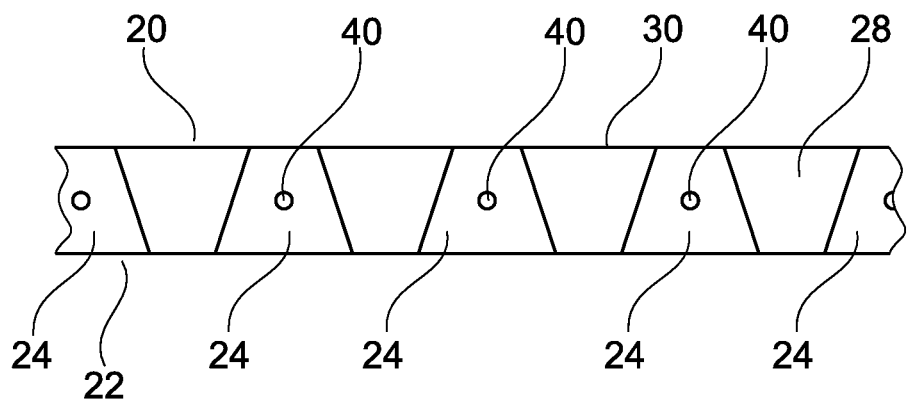

A more detailed view of the plurality of channels 26 is shown in FIGS. 3a and 3b. FIG. 3a provides a view through the plurality of channels 26. The top skin 16, the plurality of channel sidewalls 24 and the portion 30 of the spar 18 are shown in a cross-sectional view. The fastening elements 38 are arranged at the positions of the plurality of channel sidewalls 24 to connect the top skin 16 to the portion 13. The fastening elements 38 travel through the plurality of channel sidewalls 24 in a one-to-one manner. However, also more than one fastening element 38 per channel sidewall 24 may be provided.

FIG. 3b provides a top view on the mounted plurality of channel sidewalls 24. This view may also be understood as a view from the inner side of the top skin 16 down to the spar 18. The plurality of channel sidewalls 24 are arranged on the portion 30 of the spar 18. This view shows that the portion 30 provides the lower channel walls 28 for the plurality of channels 26 between the plurality of channel sidewalls 24. Furthermore, the openings 40 in the plurality of channel sidewalls 24 denote the position of the fastening elements 38 which connect the top skin 16 to the spar 18 by being arranged through the plurality of channel sidewalls 24.

In FIG. 3b, the plurality of channel sidewalls 24 are angled to each other. The distance between the channel sidewalls 24 at the front bay 20 is larger than the distance between the channel sidewalls 24 at the aft bay 22. This leads to a diminishing cross-section for the plurality of channels 26 from the front bay 20 to the aft bay 22. Therefore, an airflow flowing through the plurality of channels 26 from the front bay 20 to the aft bay 22 will be accelerated due to the diminishing cross-section. The acceleration of the airflow ensures that the airflow along the top skin 16 in the aft bay 22 reaches the end of the top skin 16, i.e. flows along the whole length of the top skin 16.

The angle between the channel sidewalls 24 of the single channel 26 determines the amount of acceleration of an airflow streaming through the channel 26. Thus, the acceleration of the airflow may be adjusted by choosing the angle between the plurality of channel sidewalls 24 of the plurality of channels 26. It is also possible, to provide a plurality of parallel channel sidewalls 24, i.e. no acceleration is provided to the airflow through the plurality of channels 26.

Figure 4A:
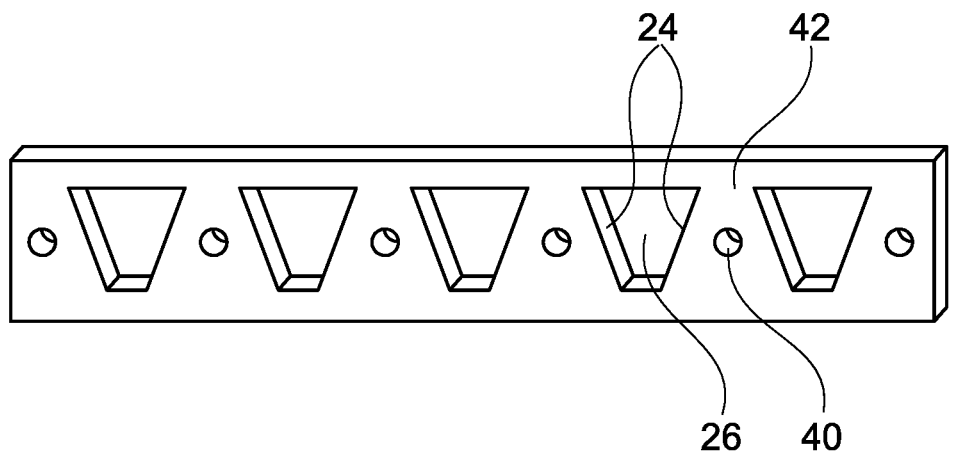
FIGS. 4a-c show different schematic examples perforated strips and combs.
Figure 4B:
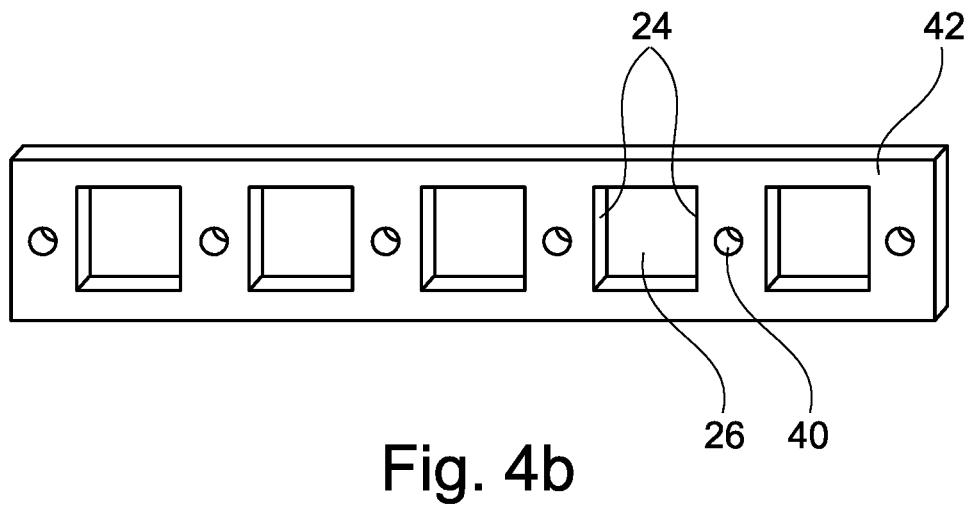
Figure 4C:
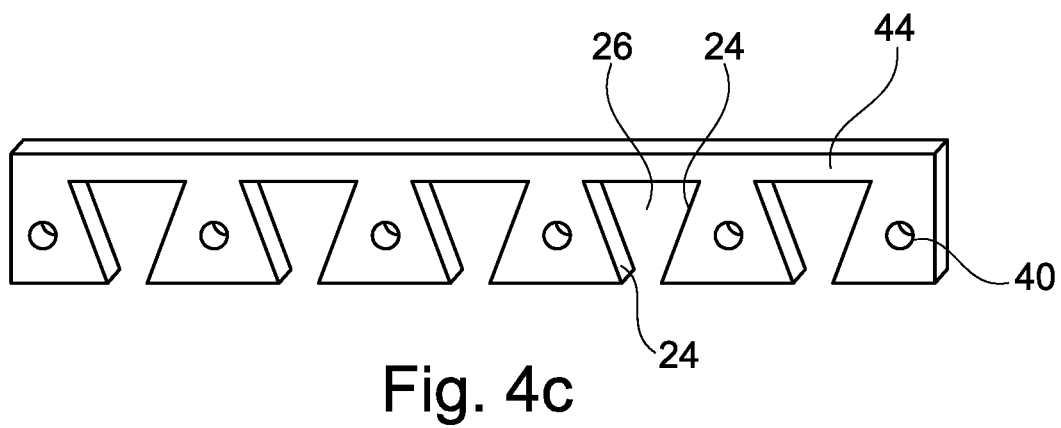

For arranging the plurality of channel sidewalls 24 to the portion 30 of the spar 18, the plurality of channel sidewalls 24 may be provided on a perforated strip 42 or a comb 44. FIGS. 4a to 4c show examples of perforated strips 42 and a comb 44.

FIG. 4a shows a perforated strip 42 comprising trapezoidal perforations. The perforations may be provided to the strip 42 by stamping, i.e. trapezoidal-shaped parts may be stamped out of the strip. Alternatively, the parts may be produced by laser cutting, water jet cutting or electron beam cutting. The perforations define the position of the plurality of channels 26. The material of the strip 42 between the perforations forms the plurality of channel sidewalls 24. The plurality of channel sidewalls 24 may further be provided with openings 40 for feeding through fastening elements.

FIG. 4b shows a perforated strip 42 comprising a plurality of channel sidewalls 24 being parallel to each other.

FIG. 4c shows a comb 44. The teeth of the comb 44 provide the plurality of channel sidewalls 24. The shape of the teeth defines the shape of the plurality of channel sidewalls 24. The space between the teeth define the location of the plurality of channels 26.

Figure 5:
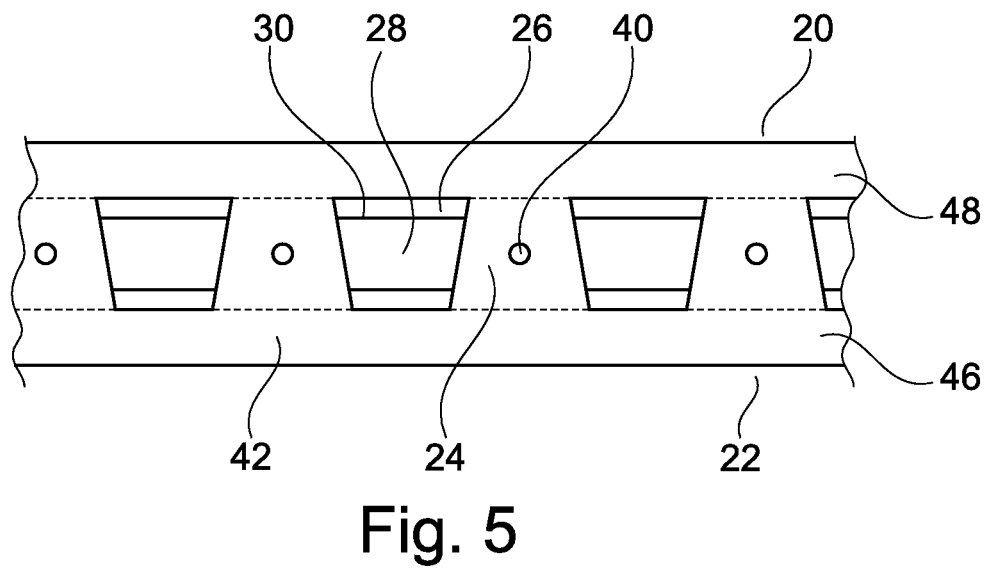
FIG. 5 shows a schematic drawing of a top view on a mounted perforated strip.

According to FIG. 5, the perforated strip 42 or the comb 44 may be arranged between the portion 30 and the top skin 18, wherein FIG. 5 does not show the top skin 18 for the sake of an unobstructed view. The perforations bridge the portion 30 such that the perforations are in fluid communication with the front bay 20 and the aft bay 22.

A portion 46 of the perforated strip 42 being arranged in the aft bay 22 may be removed to remove a possible obstacle of the airflow flowing out of the plurality of channels 26 into the aft bay 22. However, the removal of the portion 46 may not be required if the perforated strip 42 is thin in the direction between the portion 30 of the strap 18 and the top skin 16 such that the airflow is not obstructed by the portion 46.

Furthermore, a portion 48 of the perforated strip 42 being arranged in the front bay 20 may also be removed. This also applies to the comb 44. This may also improve the airflow through the plurality of channels 26 since the portion 48 may provide an obstacle for the entry of the air into the plurality of channels 26. Thus, the entry of the air into the plurality of channels 26 may be simplified by the removal. Also, in this case, the removal may not be required if the perforated strip 42 or the comb 44 are thin in direction between the portion 30 of the strap and the top skin 16.

Figure 6A:
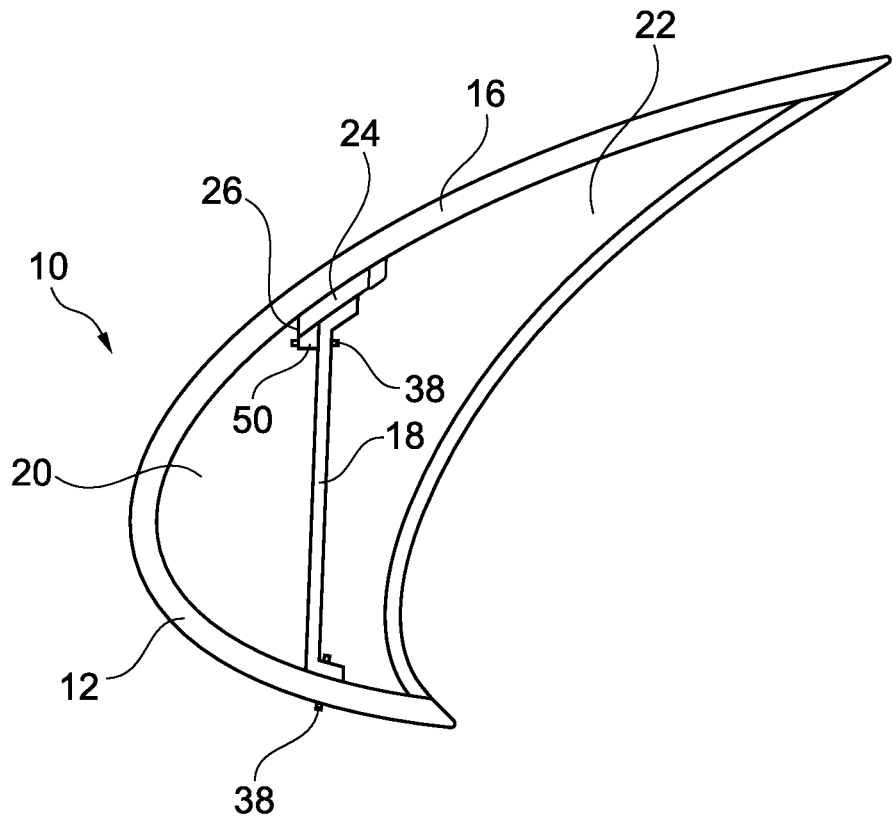
FIGS. 6a, 6b show schematic drawings of channel sidewalls with a flange.
Figure 6B:
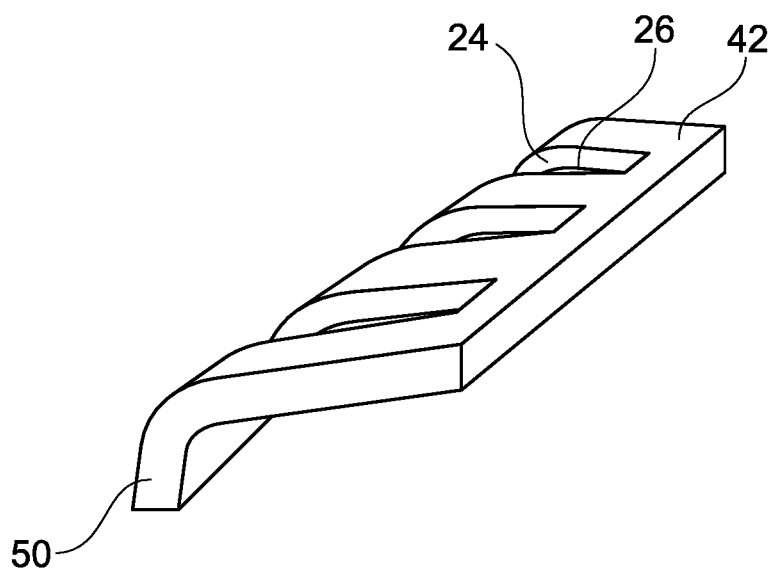

FIGS. 6a and 6b show an alternative exemplary embodiment of the invention. In this embodiment, as shown in FIG. 6a, the portion 48 of the perforated strip 42 being arranged between the spar 18 and the top skin 16 is bend away from the top skin 16 towards the spar 18. The portion 48 therefore forms a flange 50 which is connected to the plurality of channel sidewalls 24. Furthermore, the flange 50 may be connected to the spar 18 by fastening elements 38. The presence of the flange 50 has the effect that the perforated strip 42 is angled which improves the area moment of inertia of the perforated strip 42. Thus, this embodiment comprises an increased stability.

The perforated strip 42 according to FIG. 6a is bend after mounting the perforated strip 42 between the strap 18 and the top skin 16.

FIG. 6b shows a perforated strip 42 which is a bend before the installation on the strap 18.

The skilled person understands that also the portion 46 of the perforated strip 42 may be bend towards the strap 18 to provide a flange (not shown). This will have analogous effects to as the bending of portion 48.

FIG. 7 shows an aircraft as an example of an aerospace vehicle 52 comprising a wing 54 with a leading-edge. The vented leading-edge assembly 10 may be arranged at the leading-edge of the wing 54. Thus, the vented leading-edge assembly 10 provides the slat 12 for the wing 54.

FIGS. 8a and 8b show different exemplary embodiments of a method 100 for manufacturing a vented leading-edge assembly according to the above description.

In step 102, a slat comprising a bay and a top skin is provided. The top skin delimits a portion of the bay.

In step 104, a spar is arranged in the bay of the slat. The spar divides the bay into a front bay and an aft bay.

According to step 106, a strip comprising a row of a plurality of perforations is provided. The strip is therefore a perforated strip. The material between the perforations define a plurality of channel sidewalls. Alternatively, also a comb comprising a plurality of teeth may be provided wherein those teeth define a plurality of channel sidewalls.

According to step 108, the strip is connected between the spar and the top skin. The connection is performed such that the perforations bridge the spar, i.e. providing fluid communication between the front bay to the aft bay. This means, that one portion of the perforations opens to the front bay and another portion of the perforations opens to the aft bay. A portion between the front bay and the aft bay provides a channel which is arranged between the spar and the top skin. Furthermore, this means, that a portion of the spar defines a lower channel wall for those channels.

According to FIG. 8a, the method may comprise step 110 in which at least one portion of the strip being arranged between the row of perforations and the aft bay is removed. Optionally, also step 112 may be provided in which at least one portion of the strip being arranged between the row of perforations in the front bay may be removed.

The removal of the portions may improve the airflow from the front bay through the plurality of channels to the aft bay along the top skin.

According to FIG. 8b, step 110 may be left out and only step 112 may be performed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vented leading-edge assembly comprising:
    a slat comprising a bay and a top skin delimiting a portion of the bay;
    a spar arranged in the slat, the spar dividing the bay in a front bay and an aft bay; and
    a plurality of channel sidewalls arranged between the top skin and the spar, the plurality of channel sidewalls defining a plurality of channels between the front bay and the aft bay,
    wherein at least a portion of the spar defines lower channel walls for the plurality of channels, and
    wherein the plurality of channel sidewalls is provided by a perforated strip arranged between the top skin and the spar.

2. The vented leading-edge assembly according to claim 1, wherein the plurality of channel sidewalls is non-parallel to each other such that a distance between the plurality of channel sidewalls at the front bay is bigger than a distance between the plurality of channel sidewalls at the aft bay.

3. The vented leading-edge assembly according to claim 1, wherein the plurality of channel sidewalls is parallel.

4. The vented leading-edge assembly according to claim 1, wherein the leading-edge assembly comprises a plurality of fastening elements connecting the top skin to the spar through the plurality of channel sidewalls.

5. The vented leading-edge assembly according to claim 1, wherein the front bay comprises a de-icing air outlet configured to fill the front bay with de-icing air.

6. The vented leading-edge assembly according to claim 5, wherein the de-icing air outlet is a bleeding air outlet in fluid communication with an engine of an aerospace vehicle.

7. The vented leading-edge assembly according to claim 1, further comprising a rear skin rearward of the spar and delimiting the aft bay, wherein the rear skin comprises a plurality of openings along a bottom of the rear skin.

8. An aerospace vehicle comprising
    a wing; and
    a vented leading-edge assembly according to claim 1;
    wherein the vented leading-edge assembly is arranged on a leading-edge of the wing.

9. A method for manufacturing a vented leading-edge assembly, the method comprising:
    providing a slat comprising a bay and a top skin delimiting a portion of the bay;
    arranging a spar in the bay such that the spar divides the bay into a front bay and an aft bay;
    providing a strip comprising a row of channel sidewalls that define a plurality of perforations; and
    connecting the strip between the spar and the top skin such that each perforation of the plurality of perforations is in fluid communication with the front bay and the aft bay, thereby providing a plurality of channels between the front bay and the aft bay,
    wherein at least a portion of the spar defines lower channel walls for the plurality of channels.

10. The method according to claim 9, wherein the method further comprises at least one of the following steps:
    removing at least one portion of the strip arranged between the row and the aft bay; and
    removing at least one portion of the strip arranged between the row and the front bay.

* * * * *